United States Patent [19]
Abbey et al.

[11] 3,949,608
[45] Apr. 13, 1976

[54] ELECTRONIC DEVICE FOR DETERMINING THE AVERAGE TEMPERATURE OF A FLOW OF GAS

[75] Inventors: Antony F. Abbey, Narborough; James Hatfield, Coalville, both of England

[73] Assignee: British Gas Corporation, London, England

[22] Filed: Aug. 5, 1975

[21] Appl. No.: 602,086

[30] Foreign Application Priority Data
Aug. 14, 1974   United Kingdom............... 35785/74

[52] U.S. Cl. .............. 73/344; 73/198; 235/92 MT; 235/150.51
[51] Int. Cl.²...................... G01K 3/02; G01K 7/24
[58] Field of Search .. 73/339 R, 344, 193 R, 194 E, 73/198 L, 31 R; 235/150.51, 151.3, 151.34, 183, 193, 195, 196, 92 MT, 92 FL, 92 DM, 92 NT; 340/347 NT

[56] References Cited
UNITED STATES PATENTS

| | | | |
|---|---|---|---|
| 2,137,133 | 11/1938 | Dallman........................... | 73/193 R |
| 2,912,163 | 11/1959 | Van Tuyl....................... | 235/183 |
| 3,217,144 | 11/1965 | Hinnah ........................ | 235/92 MT |
| 3,527,086 | 9/1970 | Evans et al. ...................... | 73/346 X |
| 3,639,737 | 1/1972 | McKee............................ | 73/193 R X |
| 3,731,072 | 5/1973 | Johnston.......................... | 73/344 X |
| 3,812,713 | 5/1974 | Karlsson........................... | 73/193 R |
| 3,831,011 | 8/1974 | Hulme........................... | 73/194 E X |

*Primary Examiner*—Richard C. Queisser
*Assistant Examiner*—Frederick Shoon
*Attorney, Agent, or Firm*—Finnegan, Henderson, Farabow & Garrett

[57] ABSTRACT

A device for use with a gas flow meter for automatically averaging the temperature of a gas flow with respect to its volume, includes a temperature sensing device for sensing the temperature of the gas flow through the flow meter and means responsive to the output of the temperature sensing device for deriving an output signal representing the temperature recorded by the device at any instant. Successive flow signals from the flow meter each representing the flow of a predetermined volume of gas are totalled in a first summing means, and the output signal derived from the temperature sensing device is entered into a second summing means whenever a flow signal is entered into the first summing means such that the second summing means totals successive temperature signals. The total stored in the second summing means is automatically divided by the total stored in the first summing means whenever the totals are updated, and the output from the dividing means thereby represents the average temperature of the total volume of gas which has flowed.

6 Claims, 1 Drawing Figure

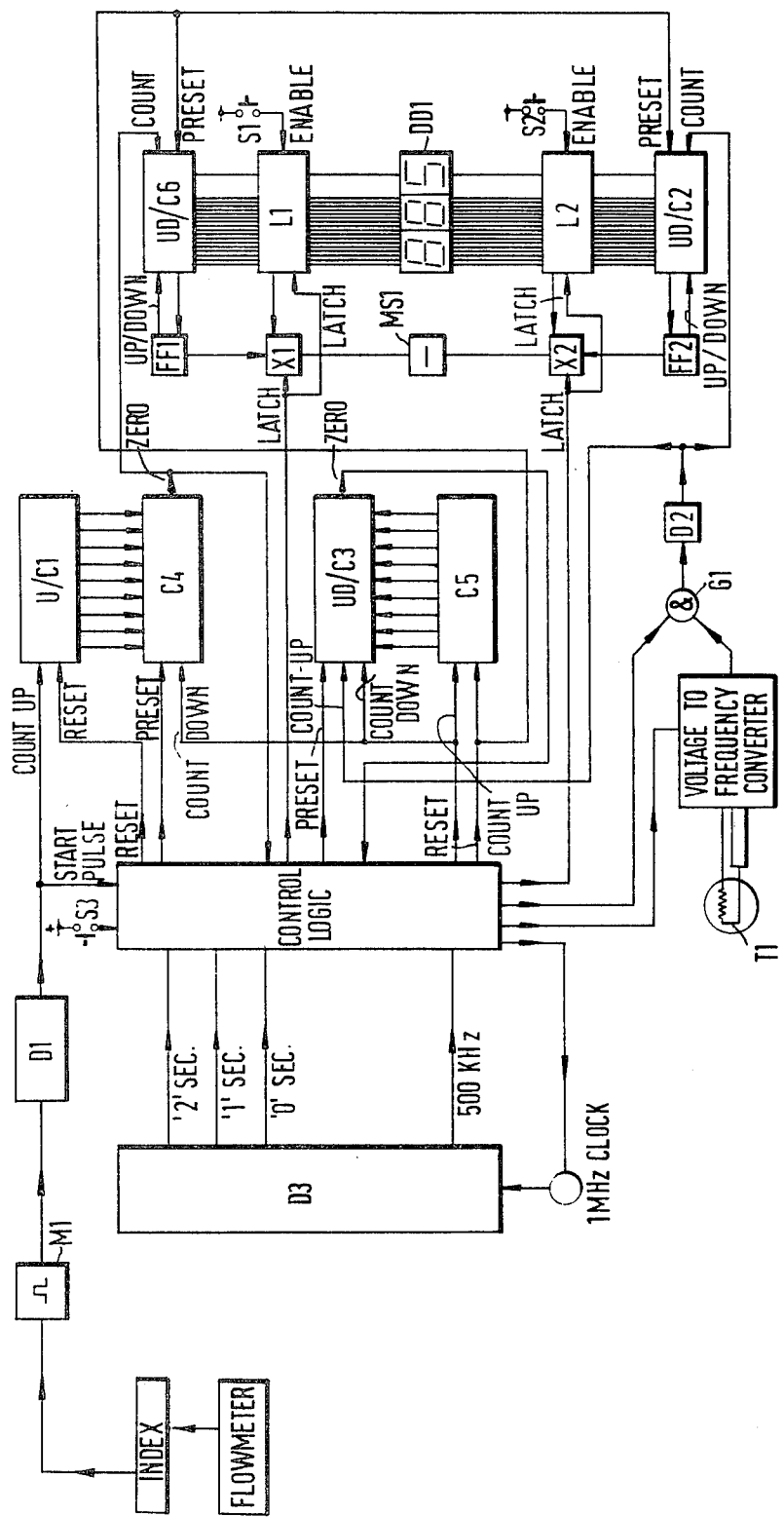

ELECTRONIC DEVICE FOR DETERMINING THE AVERAGE TEMPERATURE OF A FLOW OF GAS

The volume of a constant mass of gas varies with respect to its temperature, and consequently, when measuring the volume of a flow of gas, it is desirable to take some account of the temperature of the gas so that the volume of gas under standard conditions can be established.

This is particularly important in the supply of fuel gas to industrial users. In the past the temperature of the fuel gas has been averaged with respect to time to give an indication of the average temperature of the gas but since the flow rate of the fuel gas is not necessarily related to time such an average temperature gives an unsatisfactory result. To give a true indication of the average temperature of the flow of gas the temperature of the flow should be averaged with respect to the volume flow of the gas and, in the past, this has been achieved by a chart recorder. Such a chart recorder is fixed to, and driven by, a conventional volume measuring meter so that the movement of the chart is governed by the volume flow of gas and the movement of an indicator leaving a trace on the chart is governed by the temperature of the gas. The chart is subsequently removed and assessed manually to determine the average temperature with respect to the volume. Such a chart recorder requires frequent changes of the chart, and considerable calculation and skill is needed to assess the average temperature.

According to this invention we overcome these disadvantages by a device which is for use with a gas flowmeter and which automatically averages the temperature of the gas flow with respect to its volume, the device comprising a temperature sensing device for sensing the temperature of the gas flow through the flowmeter, means responsive to the output of the temperature sensing device for deriving an output signal representing the temperature recorded by the device at any instant, first summing means having an input which, in use, is coupled to the flowmeter such that successive flow signals from the flowmeter each representing the flow of a predetermined volume of gas are totalled in the first summing means, second summing means, means for entering the derived output signal from the temperature sensing device into the second summing means whenever a flow signal is entered into the first summing means such that the second summing means totals successive temperature signals, means for automatically dividing the total stored in the second summing means by the total stored in the first summing means whenever the totals are updated, the output from the dividing means thereby representing the average temperature of the total volume of gas which has flowed, and means responsive to the average temperature signal for indicating the average temperature.

In a preferred embodiment of the invention the flow signal is derived from the index of a conventional flow meter, the index generating an electrical impulse each time a predetermined volume of gas passes through the flow meter.

Preferably the first summing means is an UP counter and the second summing means is an UP-DOWN counter, and the means for dividing the total stored in the UP-DOWN counter by the total stored in the UP counter includes a further counter which is parallel loaded from the UP counter and then counted down at the same rate as the UP-DOWN counter. The sum stored in the UP counter is always less than the sum stored in the UP-DOWN counter and as soon as the further counter has been counted down to zero it produces a output signal which is fed to a further UP counter which provides the average temperature signal. At the same time the further counter is again loaded with the total in the first UP counter and the process is repeated until the UP-DOWN counter has been counted down to zero. The number of output pulses from the further counter thus represents the quotient of the division.

Preferably the sensing means for sensing the temperature of the gas flow is provided by a resistance element positioned in the flow of gas and the resistance of which varies with respect to the temperature of the gas flow, the resistance element being coupled to a voltage to frequency converter, the arrangement being such that the frequency of the output of the converter is dependent upon the temperature of the gas flow. This arrangement thus provides a signal whose frequency represents the temperature of the gas flow. The output from the frequency converter is gated to the UP-DOWN counter and thus when the output of the frequency converter is fed to the UP input of the UP-DOWN counter it counts up the UP-DOWN counter and increases the count in the UP-DOWN counter which represents the total of the temperature signals.

Preferably the device further includes a temporary store connected to the UP-DOWN counter for temporarily storing the count contained in the UP-DOWN counter so that after the count contained in the UP-DOWN counter has been divided by the count contained in the UP counter, the count contained in the temporary store, which represents the total of the temperature representing signals is returned to the UP-DOWN counter. This enables the device to be arranged so that the temperature is averaged with respect to the volume each time a flow signal is provided, and in this way the average temperature of the gas with respect to its volume is continually up-dated.

The device may also include means responsive to the temperature signal for indicating the actual temperature of the gas flow at a particular instant as represented by the temperature signal. This facility is particularly useful during the initial calibration of the device.

A pre-set divider may be provided between the means for providing a flow signal and the first summing means to enable a scaling factor to be introduced, and thus permits the device to operate over a wide range of volume flows. In practice, a device in accordance with this invention can only be made to perform a maximum number of operations of the order of 100 operations per hour, and consequently, if the index of the flow meter provides impulses at a rate greater than this, a scaling factor has to be introduced by the pre-set divider so that the impulses are only supplied to the device at a lower rate with which the device can cope.

Preferably the means for indicating the average temperature and the means for indicating the actual temperature at any instant, when the latter is included in the device, are arranged so that the temperatures are only displayed on manual operation of a push-button switch. Devices giving a visual indication usually have a high current drain, and by incorporating this feature the total current usage of the device can be reduced to a minimum so that it becomes practical for the device to be powered by a small battery of dry cells. Such a requirement is useful since gas metering units are often placed in a position remote from power supplies, and when handling a fuel gas it is desirable that the device be battery operated.

Preferably the device also includes a manually operable re-set button. When an operator reads the flow meter to determine the total volume of gas passed by the flow meter the operator then pushes the push-button switch to provide a read-out of the temperature of the gas averaged with respect to its volume and notes this average temperature. From the reading of the measured total volume flow and the average temperature, the volume of gas used under standard conditions can easily be determined. The operator then pushes the manual re-set button which zeros all the counters and the device is then ready to average the temperature with respect to volume for a further period until the meter is read on a successive occasion.

One example of a device embodying the invention will now be described with reference to the accompanying drawing in which the sole figure is a block circuit diagram of a device for automatically measuring the average temperature of a fuel gas supplied to an industrial user.

The device illustrated in this FIGURE is coupled to the index of a conventional volume flow meter, the index including a pair of contacts which are closed each time a predetermined volume of gas passes through the flow meter. A supply of current passing through these contacts is thus interrupted each time the predetermined volume of gas is passed by the flow meter, and the resulting pulses are fed to a Schmitt trigger and monostable circuit which together act as a pulse shaping circuit. This is shown on the FIGURE as a single block M1. The resulting square pulses are then fed through a preset divider D1 which allows for a scaling factor to be introduced and so permits the device to operate over widely differing rates of demand. In practice divider D1 divides the incoming pulses by 1, 2, 4, 10, 20 or 40, these values having been found to give an adequate range. The pulses emerging from the divider D1 are still proportional to the flow of gas through the flow meter and these pulses are fed to a 19 bit, low frequency binary UP-counter U/C1 as well as to a control logic circuit. The number of pulses stored in the counter U/C1 thus represents, at any time, the total volume of gas passsed by the flow meter from the start of the period for which the flow is being measured.

A platinum resistance thermometer T1 is inserted into a pipe line through which the gas is flowing. This resistance thermometer controls the voltage-to-frequency converter, the output frequency of which varies between 200 Hz and 1.4 kHz, so that the output frequency of the converter is dependent on the resistance of the resistance thermometer and hence on the temperature of the gas flow. The output of the voltage-to-frequency converter is gated through an AND gate G1 and into a divider D2, and the output of this divider D2 is fed to an actual temperature UP-DOWN counter UD/C2 as well as to the count-up input of a total temperature, 24 bit binary UP-DOWN counter UD/C3. The resistance thermometer T1 and the voltage-to-frequency converter, together with a 1 MHz clock feeding a seven decade divider D3, are switched on by the control logic circuit on receipt of a start pulse from the output of divider D1. After allowing a 1 second warm up period for the thermometer and voltage-to-frequency converter, a one second gating pulse from divider D3 is applied via the control logic to the other input of AND gate G1 thus allowing a burst of oscillations generated by the voltage-to-frequency converter to pass through AND gate G1 and divider D2. The number of oscillations generated during the period of one second for which AND gate G1 is enabled are proportional to the temperature of the gas flowing through the pipe line and consequently the counters UD/C2 and UD/C3 both register a count proportional to the temperature of the gas flow through the pipe line. It is convenient if the system is arranged so that this count corresponds exactly to the temperature of the gas in degrees centigrade.

A second 19 bit binary counter C4 is parallel loaded from the counter U/C1. A further 24 bit binary counter C5 acts as a temporary store for the total temperature signal, and is connected to the counter UD/C3.

At the beginning of a cycle, i.e. when a pulse is received from divider D1, the counter/store C5 is reset, and, after 1 second, the count-up input of counter UD/C3 receives the burst of pulses from divider D2. A '2' second pulse from divider D3 then turns off the thermometer and gates a 500 kHz oscillation from the divider D3 to the count-up input of the counter/store C5, and to the count-down inputs of counters UD/C3 and C4. Thus the contents of C4 and UD/C3 are counted down at the same rate until C4 is empty. At this point an output pulse from C4 is fed to the control logic which again loads the contents of U/C1 into C4. This process continues until UD/C3 has been counted down to zero, the number of output pulses from C4 representing the result of dividing the count stored in UD/C3 by the count stored in U/C1, that is to say the result of dividing the temperature sensed by the thermometer T1 by the volume of gas flow. For the first reading of the thermometer, assuming that the count stored in UD/C3 represents the temperature in degrees centigrade, only a single pulse will be stored in counter U/C1, so that the number of output pulses from C4 will correspond to the count stored in UD/C3.

As soon as the counter UD/C3 has been counted down to zero, the output from UD/C3 causes the control logic circuit to stop the division. The output pulses from C4 are summed in an average temperature UP-DOWN counter UD/C6 which thus, after the first reading of the thermometer, will register a count equal to that reading. The count accumulated in the counter/store C5 during the division corresponds to the count that was in the counter UD/C3 before the division commenced, and at the end of the division the control logic circuit loads the count from C5 into the counter UD/C3. At this point the circuit is once again ready to receive the next input pulse from the divider D1 and ready to take the next reading of the temperature of the gas flowing through the pipe line.

When the next pulse appears from divider D1, the thermometer T1 again senses the temperature and the count in counter UD/C3, which already contains the count loaded into it from the counter/store C5, is counted up a further amount corresponding to the new temperature measured. At the same time the total volume UP counter U/C1 is counted up one further count. As before, the contents of UD/C3 are divided by the contents of U/C1, and the resulting output from C4 represents the average of the two temperature readings which have been taken. This process is repeated, updating the average temperature each time a predetermined volume of gas is passed through the flow meter.

In order that the actual and average temperature UP-DOWN counters UD/C2 and UD/C6 may contain negative numbers to represent temperatures less than freezing point, the counters UD/C2 and UD/C6 are preset to 30 at the beginning of each cycle and a pair of polarity flip-flops FF1, FF2 are set to negative. The counters then count down to zero at which point the respective polarity flip-flop is reset to positive and the count mode is set to up. Further pulses into the counters cause them to count up again from zero to the required count.

The units stored in the counters UD/C2 and UD/C6 can be displayed by decade counter display DD1, the units decade of the display being preceded by a divide-by-two flip-flop so that halves of degrees may be displayed.

A decade latch and decode unit L1 is positioned between the average temperature counter UD/C6 and the decade display DD1. A similar decade latch and decode unit 12 is positioned between counter UD/C2 and the display unit DD1.

A pair of bush-button switches S1, S2 are provided to enable each of the decade latch and decode circuits L1, L2 so that, depending on which push-button switch is pressed, either the average temperature or the actual temperature will be indicated on the display unit DD1. The circuits L1, L2 are connected to respective stores X1, X2 which each contain a flip-flop and a gate. At a certain time during each cycle, the control logic generates latch signals which are fed to the gates of stores X1 and X2 so that the current state of the polarity flip-flops is transferred and held in the respective store X1 or X2. On pressing the switch S1 or S2, the contents of the flip-flop in X1 or X2 respectively are gated to a unit MS1 which displays a minus sign alongside the display DD1 whenever the average or actual temperature is below zero. The use of push-button switches (rather than providing a continuous display) enables the device to be operated with low current consumption and it may therefore be battery powered.

At intervals, typically each month, the total volume indicated by the flow meter (not illustrated) is read, and the push-button switch S1 is pressed to give a readout of the average temperature of the gas flow during the past month. A manual reset button S3 is then depressed to zero all the counters. The actual volume of gas used under standard conditions is then determined from the average temperature and the volume of gas used at this average temperature.

We claim:

1. A device for use with a gas flowmeter for automatically averaging the temperature of the gas flow with respect to its volume, the device comprising a temperature sensing device for sensing the temperature of the gas flow through the flowmeter, means responsive to the output of the temperature sensing device for deriving an output signal representing the temperature recorded by the device at any instant, first summing means having an input which, in use, is coupled to the flowmeter such that successive flow signals from the flowmeter each representing the flow of a predetermined volume of gas are totalled in the first summing means, second summing means, means for entering the derived output signal from the temperature sensing device into the second summing means whenever a flow signal is entered into the first summing means such that the second summing means totals successive temperature signals, means for automatically dividing the total stored in the second summing means by the total stored in the first summing means whenever the totals are updated, the output from the dividing means thereby representing the average temperature of the total volume of gas which has flowed, and means responsive to the average temperature signal for indicating the average temperature.

2. A device according to claim 1 in which the first summing means is an UP counter and the second summing means is an UP-DOWN counter, the means for dividing the total stored in the UP-DOWN counter by the total stored in the UP counter including a further counter which is parallel loaded from the UP counter and means for counting down the further counter and the UP-DOWN counter at the same predetermined rate.

3. A device according to claim 2 in which the dividing means further comprises means responsive to an output from the further counter indicating that the counter has been counted down to zero for re-loading the further counter with the total in the UP counter, the countdown being continued until the UP-DOWN counter has been counted down to zero.

4. A device according to claim 3 in which an output pulse is generated each time the further counter is counted down to zero and the output pulses are fed to a second UP counter which provides the average temperature signal.

5. A device according to claim 4 in which the means responsive to the output of the temperature sensing device includes a voltage to frequency converter, and further comprising means for gating the output from the converter to the count up input of the UP-DOWN counter whenever a flow signal is fed to the first UP counter.

6. A device according to claim 2 in which a temporary store is connected to the UP-DOWN counter for temporarily storing the count contained in the UP-DOWN counter during the countdown period, the count contained in the temporary store being reloaded into the UP-DOWN counter in response to an output signal from the UP-DOWN counter indicating that the countdown has been completed.

* * * * *